United States Patent [19]
Wick et al.

[11] 3,815,147
[45] June 4, 1974

[54] CASSETTE WITH PHOTOGRAPHIC ROLL FILM

[75] Inventors: Richard Wick; Alfred Winkler, both of Munich, Germany

[73] Assignee: AFGA-Gevaert AG, Leverkusen, Germany

[22] Filed: Mar. 15, 1973

[21] Appl. No.: 341,608

[30] Foreign Application Priority Data
Mar. 23, 1972  Germany............................ 2214151

[52] U.S. Cl. ................................ 354/203, 354/275
[51] Int. Cl. ............................................ G03b 17/26
[58] Field of Search ................. 95/31 CA, 31 R, 1.1

[56] References Cited
UNITED STATES PATENTS

| | | | |
|---|---|---|---|
| 981,064 | 1/1911 | Cole ............................. | 95/31 CA |
| 1,997,333 | 4/1935 | Hultquist et al. ............... | 95/31 FM |
| 2,557,297 | 6/1951 | Lea .............................. | 95/31 R |
| 3,347,142 | 10/1967 | Steisslinger .................... | 95/31 CA |
| 3,665,829 | 5/1972 | Putscher et al. ................ | 95/31 CA |
| 3,684,206 | 8/1972 | Edwards ........................ | 95/31 CA X |

*Primary Examiner*—Samuel S. Matthews
*Assistant Examiner*—Kenneth C. Hutchison
*Attorney, Agent, or Firm*—Michael S. Striker

[57] ABSTRACT

A cassette for photographic roll film which is surrounded by a strip of opaque backing paper. The cassette has a film supplying section which receives a roll of unexposed film and backing paper, a film collecting section containing a takeup reel, and a channel-shaped intermediate section having a front wall which is provided with a light-admitting window in register with successive unexposed frames of film when the cassette is inserted into the body of a camera and the film transporting mechanism is actuated prior to the making of successive exposures. Portions of the film and backing paper extend through the intermediate section of the housing in such a way that the film is located immediately behind the window and the backing paper is located between the film and the rear wall of the intermediate section. A spring-biased pressure plate is mounted in the intermediate section between the backing paper and film so as to maintain the film behind the window in a predetermined plane. The pressure plate is biased forwardly by several resilient prongs which engage upwardly and downwardly extending projections of the pressure plate and urge such projections against abutments on the front wall of the intermediate section. The flattening action of the pressure plate upon the film is independent of the curvature and/or stiffness of backing paper in the intermediate section.

10 Claims, 3 Drawing Figures

CASSETTE WITH PHOTOGRAPHIC ROLL FILM

BACKGROUND OF THE INVENTION

The present invention relates to containers for photographic roll film, and more particularly to improvements in containers of the type known as cassettes and serving for storage of convoluted photographic roll film which is surrounded by a strip of opaque backing paper.

As a rule, a cassette of the just outlined character comprises a housing which includes a film supplying section, a film collecting section which contains a rotary takeup reel, and a channel-shaped intermediate section wherein the film and backing paper advance toward and into the film collecting section to be convoluted on the core of the takeup reel. A pressure plate is normally provided in the intermediate section behind the backing paper to flatten the film behind a light-admitting window which is formed in the front wall of the intermediate section and registers with a window behind the picture taking lens when the cassette is installed in a photographic apparatus.

A drawback of such cassettes is that the position of film frames behind the window in the front wall of the intermediate section cannot be determined with a requisite degree of accuracy and reproducibility. This is due to the fact that the pressure plate bears against the backing paper so that its film flattening action depends on a number of unpredictable factors, particularly on the stiffness of backing paper and on the extent to which the backing paper tends to curl in the intermediate section in front of the pressure plate. The pressure plate in the intermediate section of a conventional cassette is normally biased toward the front wall; however, such bias cannot exceed a predetermined magnitude in order to avoid damage to the film so that the stiffness of backing paper is likely to influence the flattening action and hence the quality of exposures.

SUMMARY OF THE INVENTION

An object of the invention is to provide a novel and improved drop-in container or cassette for photographic roll film wherein the foremost unexposed film frame can be invariably maintained in a predetermined plane regardless of the characteristics of backing paper for the film.

Another object of the invention is to provide a container wherein the condition and/or composition of backing paper cannot influence the guidance of film in the intermediate section of the cassette between the film supplying and film collecting sections.

A further object of the invention is to provide a novel and improved pressure plate for use in drop-in cassettes or containers for photographic roll film which is protected by a strip of backing paper or the like.

An additional object of the invention is to provide a novel and improved housing for a drop-in cassette or container for photographic roll film and backing paper.

The invention is embodied in a container or cassette for photographic roll film which comprises a housing including a film supplying first section, a film collecting second section and an intermediate section which extends between the first and second sections and defines a path for controlled transport of film and backing paper from the first into the second section. The intermediate section has a rear wall and a front wall which latter is provided with a light-admitting window facing the picture taking lens of a camera which receives the housing. The cassette or container further comprises a roll of convoluted photographic film and backing paper which is stored in the first section. The backing paper has a portion which extends through the intermediate section and the film has a portion which extends through the intermediate section between the backing paper and the window.

In accordance with a feature of the invention, the container or cassette further comprises a spring-biased pressure plate which is installed in the intermediate section between the backing paper and the film and serves to maintain the film behind the window in a predetermined plane independently of the condition or characteristics of backing paper. To this end, the pressure plate has projections which are biased against abutments on the front wall of the intermediate section by one or more springs which are mounted on the rear wall of the intermediate section.

The novel features which are considered as characteristic of the invention are set forth in particular in the appended claims. The improved cassette itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
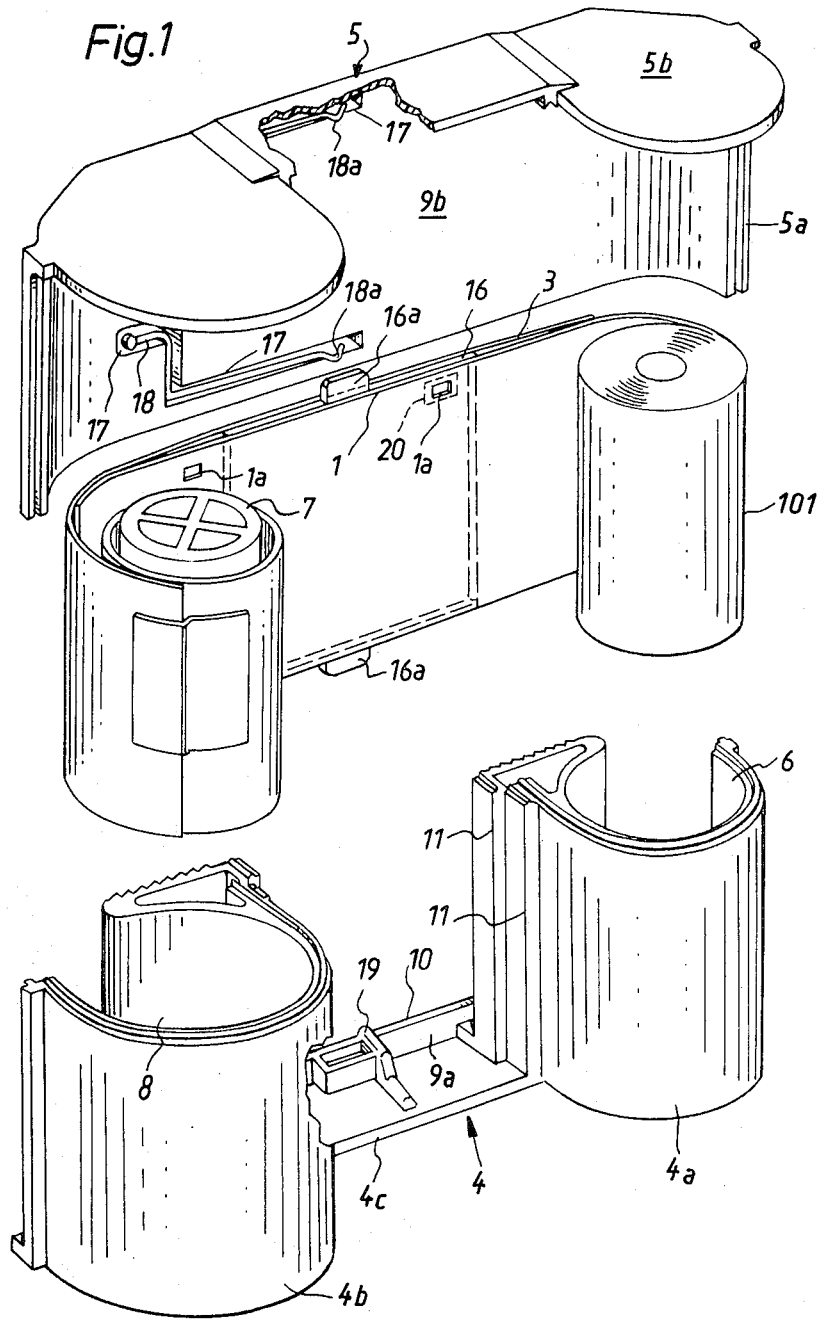
FIG. 1 is an exploded perspective view of a cassette which embodies the invention.
Figure 2:
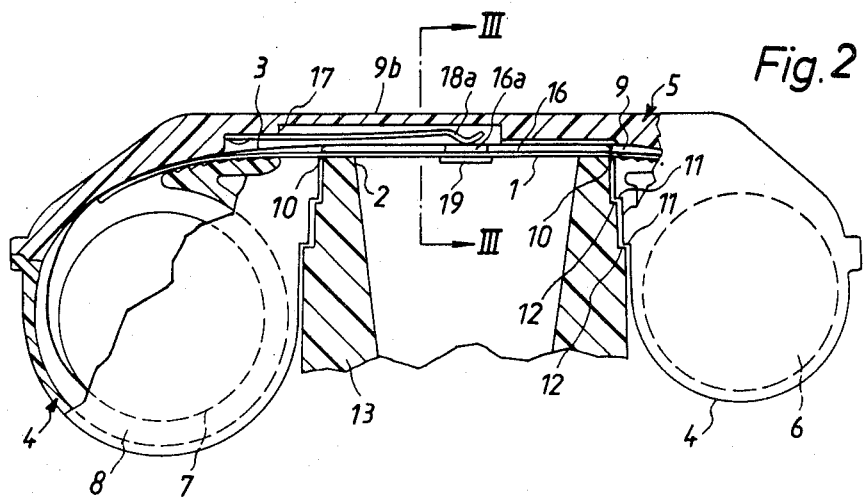
FIG. 2 is a partial plan and partial horizontal sectional view of the cassette, further showing a portion of a still camera which accommodates the cassette.

The improved container or cassette which is shown in FIGS. 1 and 2 comprises a housing consisting of three main sections which include a film supplying section 6, a film collecting section 8 and a channel-shaped intermediate section 9. The housing consists of synthetic plastic material and is assembled of several discrete parts which can be permanently or separably connected to each other. These parts include a front part 4 and a rear part 5 (see particularly FIG. 1). Each of the two housing parts includes a portion of each of the three sections 6, 8 and 9. As can be seen in FIG. 1, the rear part 5 includes a curved wall 5a and a top wall 5b; the front part 4 includes two arcuate shells 4a, 4b and a bottom wall 4c.

Figure 3:
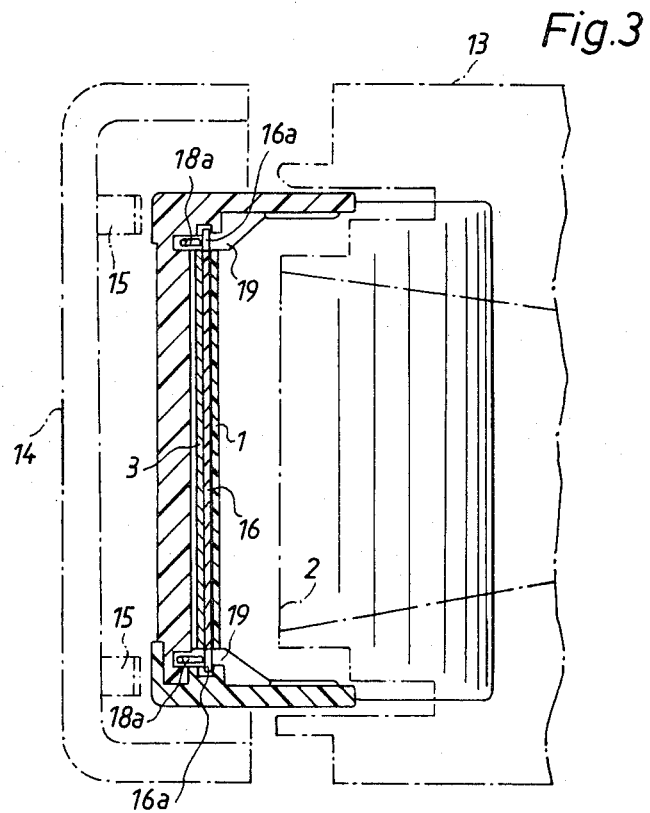
FIG. 3 is an enlarged transverse vertical sectional view as seen in the direction of arrows from the line III—III of FIG. 2, with portions of the camera indicated by phantom lines.

The housing of a fresh cassette contains a roll 101 including convoluted unexposed photographic roll film 1 which is provided with a row of perforations 1a, one for each film frame. The unexposed roll film 1 is stored in the film supplying section 6 and its convolutions alternate with the convolutions of a strip 3 of opaque backing paper (hereinafter called backing strip). The backing strip 3 carries a series of equidistant numerals (not shown) which denote successive film frames and can be seen by looking through a window or opening provided in the rear wall or door 14 (see FIG. 3) of a still camera when the latter receives the cassette and the door 14 is closed.

The body 13 of the camera has a window 2 (FIGS. 2 and 3) which registers with the foremost unexposed frame of the film 1 when the camera is ready to make an exposure. Portions of the film 1 and backing strip 3 extend through the intermediate section 9 of the cassette and are attached to a takeup reel or spool 7 in the film collecting section 8. It will be noted that the portion of film 1 which extends through the intermediate section 9 of the cassette is located in front of the corresponding portion of the backing strip 3, i.e., the film travels along a path which is located immediately behind the window 2 of the camera body 13 and the backing strip 3 is nearer to the rear wall or door 14. The manner in which the takeup reel 7 can be rotated by the film transporting mechanism of the camera in order to place successive frames of the film 1 into register with the window 2 forms no part of the invention. When the cassette is properly inserted into the body 13 of the camera and the door 14 is closed, the window 2 is in register with a window 10 which is provided in the front wall 9a of the intermediate section 9. The front wall 9a of the intermediate section 9 is reinforced by ribs 11 which extend into complementary recesses or grooves 12 of the camera body 13 when the cassette is properly inserted into the body. This insures that the window 10 is held in accurate alignment with the window 2 when the door 14 is closed. The inner side of the door 14 can be provided with rigid or elastic projections 15 (indicated in FIG. 3) which urge the front side of the cassette against the camera body 13 as soon as the door 14 is closed. For example, each of the projections 15 may constitute a leaf spring.

Certain presently known cassettes for photographic roll film are provided with a pressure plate which is located behind the window in the front wall of the intermediate section and serves to flatten the foremost unexposed film frame while such film frame registers with the window of the camera body. The pressure plate bears against the rear side of the backing strip and causes the latter to bear against the adjacent portion of photographic film in the intermediate section of the housing of the cassette. A drawback of such cassettes is that, if the stiffness of the backing strip is rather pronounced, the pressure plate cannot flatten the backing strip and much less the foremost unexposed film frame behind the window of the camera body. As a rule, the curvature of the backing strip portion in the intermediate section of the cassette is different from the curvature of the adjacent portion of the film so that unsatisfactory flattening of the backing strip by a conventional pressure plate is likely to result in the making of unsatisfactory exposures because the foremost unexposed frame of the film is not located in a plane which is immediately adjacent to the rear end of the window in the camera body. The situation is aggravated if the backing strip is stiffer than the photographic film so that its flattening might necessitate the application of a substantial force which could result in damage to emulsion on the film.

In accordance with a feature of the invention, the improved cassette is provided with a pressure plate 16 which is mounted in the intermediate section 9 between the film 1 and backing strip 3 and is biased forwardly so as to engage the uncoated side of the foremost unexposed film frame with a force which is sufficient to insure satisfactory flattening of the film but is entirely independent of the stiffness or lack of stiffness of the backing strip 3 and/or the extent to which the backing strip 3 tends to curl or arch in the intermediate section 9. In the illustrated cassette, the pressure plate 16 is mounted in the intermediate section 9 with a view to hold the foremost unexposed film frame flat against the window 10 which, in turn, is in accurate register with the window 2 when the ribs 11 of the front wall of the section 9 are properly received in the matching grooves 11 of the camera body 13.

The pressure plate 16 has upward and downward projections or lugs 16a which are provided above as well as below the path for photographic roll film 1 in the intermediate section 9 and are biased forwardly by resilient elements 18a which resemble prongs or tines and are mounted in recesses 17 provided in the inner side of the rear wall 9b of the intermediate section 9 (i.e., behind that portion of the backing strip 3 which extends through the section 9). In the illustrated embodiment, the resilient elements 18a form part of a single substantially C-shaped spring 18 which is separably or permanently secured to the rear part 5 of the housing of the cassette (see the upper portion of FIG. 1). It is clear, however, that the means for biasing the pressure plate 16 forwardly can comprise two or more discrete resilient elements. Also, the pressure plate 16 may be provided with more than two projections 16a and the biasing means may comprise an equal number of discrete resilient elements each of which biases a single projection 16a. Though the drawing shows a leaf spring 18, the pressure plate 16 can be biased forwardly by one or more torsion springs, helical springs, pieces of rubber and/or other resilient means. If desired, the biasing means for the pressure plate 16 may consist of synthetic plastic material which is welded or otherwise permanently secured to the rear wall 9b of the intermediate section 9. Such plastic material should preferably exhibit some resiliency in order to insure that the front side of the pressure plate 16 will invariably bear against and flatten the film frame behind the window 10.

The front part 4 of the housing of the cassette is provided with abutments or stops 19 which are engaged by the projections 16a under the action of resilient elements 18a. This maintains the pressure plate 16 in an optimum position for satisfactory flattening of the foremost unexposed film frame.

The cassette is fully assembled in the manufacturing plant so that the leaders of film 1 and backing strip 3 are attached to the core of the takeup reel 7 when the cassette reaches the consumer. The cassette is then simply dropped into the body 13 of a suitable camera and the door 14 is closed to enable the springs 15 to urge the ribs 11 into the adjacent recesses 12 of the body 13 and to thus insure that the window 10 of the intermediate section 9 is in accurate register with the window 2 of the camera body 13. The window 2 admits light against the foremost unexposed film frame in response to opening of the shutter, not shown. Once the door 14 is closed, the user of the camera actuates the film transporting mechanism (not shown) so as to move the foremost unexposed film frame into alignment with the windows 2, 10. The foremost numeral on the backing strip 3 is then in register with the aforementioned opening in the door 14 so that the user knows that the camera is ready for the making of first exposure.

The pressure plate 16 may be provided with additional projections (not shown) which need not be engaged by resilient elements and serve to bear against the front wall 9a in response to the bias of resilient elements 18a upon the projections 16a. Thus, the pressure plate can have a set of projections or portions which bear against suitable abutments of the front wall 9a and a further set of projections or portions which are engaged by the elements of the means for biasing the pressure plate toward the front wall 9a so as to maintain the film behind the window 10 in a predetermined plane. All such projections are preferably located above or below the path for film 1 and backing strip 3 in the section 9 so as to insure that the film and/or backing strip need not be pinched between the projections of the pressure plate and the front wall 9a.

It is clear that the improved cassette is susceptible of many additional modifications without departing from the spirit of our invention. For example, the front wall 9a of the intermediate section 9 may be provided with a cutout 20 (indicated in FIG. 1 by broken lines) which enables a feeler mounted in the camera body to engage the film 1 at the level of the row of perforations 1a and to enter an oncoming perforation 1a so as to thereby arrest the film transporting mechanism at the exact moment when the foremost unexposed frame of the film 1 is in exact register with the windows 2 and 10. The feeler is automatically withdrawn from the adjacent perforation 1a in response to actuation of the camera release and thereupon reengages the film, once the latter is set in motion, to enter the next perforation, and so on.

It is also possible to provide the cassette with two reels or spools, i.e., with the takeup reel 7 and with a supply reel (not shown) which is installed in the section 6 and supports the convolutions of backing strip 3 and the convolutions of unexposed film 1 (roll 101). Furthermore, and as mentioned above, the illustrated biasing means 18 can be replaced with other types of one-piece or composite biasing means for the pressure plate 16. The ribs 11 can be provided on the camera body 13 and the intermediate section 9 is then provided with one or more matching grooves for the ribs of the camera body. It is further possible to provide locating or positioning ribs and grooves on the front wall 9a of the intermediate section 9 and complementary locating or positioning grooves and ribs on the camera body 13.

As explained above, the parts 4 and 5 of the housing of the cassette can be permanently secured to each other (e.g., by welding or by means of a suitable adhesive) or they may be separably secured to each other by means of matching ribs and notches so as to afford convenient access to exposed film when the cassette is sent or delivered to a processing laboratory. Still further, the sections 6, 8 and 9 of the cassette can be assembled of more than two parts. All that counts is to place the illustrated pressure plate 16 or an equivalent pressure plate between the backing strip and the film so that the pressure plate can flatten the foremost unexposed film frame independently of the curvature, stiffness and/or other characteristics of the backing strip.

The pressure plate 16 can be fixedly mounted in the section 9 at a predetermined distance from the inner side of the front wall 9a so as to define with the wall 9a a path which is just wide enough to allow the film 1 to pass but to maintain the film behind the window 10 in a predetermined plane.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is:

1. A combination of a container with photographic roll film, comprising a housing including a film supplying first section, a film collecting second section and an intermediate section extending between said first and second sections, said intermediate section having a front wall facing the picture taking lens of a camera which receives said housing and said front wall having a light-admitting window; a roll of convoluted photographic film and backing strip in said first section, said backing strip having a portion extending through said intermediate section into said second section and said film having a portion extending through said intermediate section between said window and said portion of said backing strip into said second section; and a pressure plate having a plane surface facing said portion of the film in said intermediate section between said portion of said film and said portion of said backing strip to invariably maintain the film behind said window in a predetermined plane independently of the characteristics of said backing strip.

2. A container as defined in claim 1, further comprising biasing means for urging said pressure plate toward said front wall.

3. A container as defined in claim 2, wherein said pressure plate comprises at least one projection adjacent to the path of film and backing strip in said intermediate section and said biasing means includes a resilient element mounted in said intermediate section and arranged to urge said projection toward said front wall.

4. A container as defined in claim 2, wherein said intermediate section defines for the film and backing strip a path wherein the film and backing strip can be transported in a direction toward said second section, said intermediate section further comprising a rear wall located behind said portion of said backing strip and said pressure plate comprising projections extending beyond opposite sides of said path, said biasing means comprising resilient means mounted on said rear wall and arranged to urge said projections against said front wall.

5. A container as defined in claim 4, wherein said rear wall has at least one recess facing said portion of said backing strip and said resilient means comprises a portion which is received in said recess.

6. A container as defined in claim 4, wherein said resilient means comprises a single spring having a plurality of elastic elements each of which engages one of said projections.

7. A container as defined in claim 6, wherein said rear wall has a recess facing said portion of said backing strip and receiving a portion of said single spring.

8. A container as defined in claim 2, wherein said front wall is provided with a plurality of abutments and said pressure plate comprises portions which engage said abutments under the action of said biasing means.

9. A container as defined in claim 8, wherein said portions of said pressure plate are projections which extend beyond the path of film and backing strip in said intermediate section.

10. A container as defined in claim 2, wherein said front wall is provided with external positioning means adapted to engage complementary positioning means in the body of a photographic apparatus.

* * * * *